United States Patent [19]
Stedron

[11] Patent Number: 6,085,643
[45] Date of Patent: *Jul. 11, 2000

[54] MOUNTING ARRANGEMENT FOR A COOKING PLATE AND RELATED METHOD

[75] Inventor: Horst Stedron, Herborn, Germany

[73] Assignee: Schott Glaswerke, Mainz, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/014,080

[22] Filed: Jan. 27, 1998

[51] Int. Cl.[7] ............................. A47B 77/08; F24C 15/10; H05B 3/68

[52] U.S. Cl. ............................. 99/422; 99/339; 99/449; 126/39 B; 126/211; 219/464; 219/467

[58] Field of Search ............................. 99/423, 339, 349, 99/449, 422; 219/464, 467; 126/39 B, 39 H, 211

[56] References Cited

U.S. PATENT DOCUMENTS

| | | | |
|---|---|---|---|
| 4,492,217 | 1/1985 | Scheidler | 126/39 B |
| 5,317,129 | 5/1994 | Taplan et al. | 219/464 |
| 5,399,839 | 3/1995 | Taplan et al. | 219/464 |
| 5,768,979 | 6/1998 | Antoine | 99/422 |

FOREIGN PATENT DOCUMENTS 0 391 122   3/1990   European Pat. Off. .

*Primary Examiner*—Reginald L. Alexander
*Attorney, Agent, or Firm*—Jansson, Shupe, Bridge & Munger

[57] ABSTRACT

Disclosed is a mounting arrangement for a cooking plate having a perimeter edge. The arrangement includes the plate and a frame around the plate, the frame having a support portion extending over the perimeter edge and a rib extending away from the support portion. In the improvement, the perimeter edge and the rib define a space between them and the space is filled with reaction foam. A related method for mounting a cooking plate and a mounting support to one another includes the steps of constructing a mounting support having a support portion and a rib and providing a cooking plate having a perimeter edge. The cooking plate and the mounting support are placed against one another so that the cooking plate and the rib have a space between them. The space is filled with reaction foam, preferably by injecting such foam through a nozzle.

14 Claims, 1 Drawing Sheet

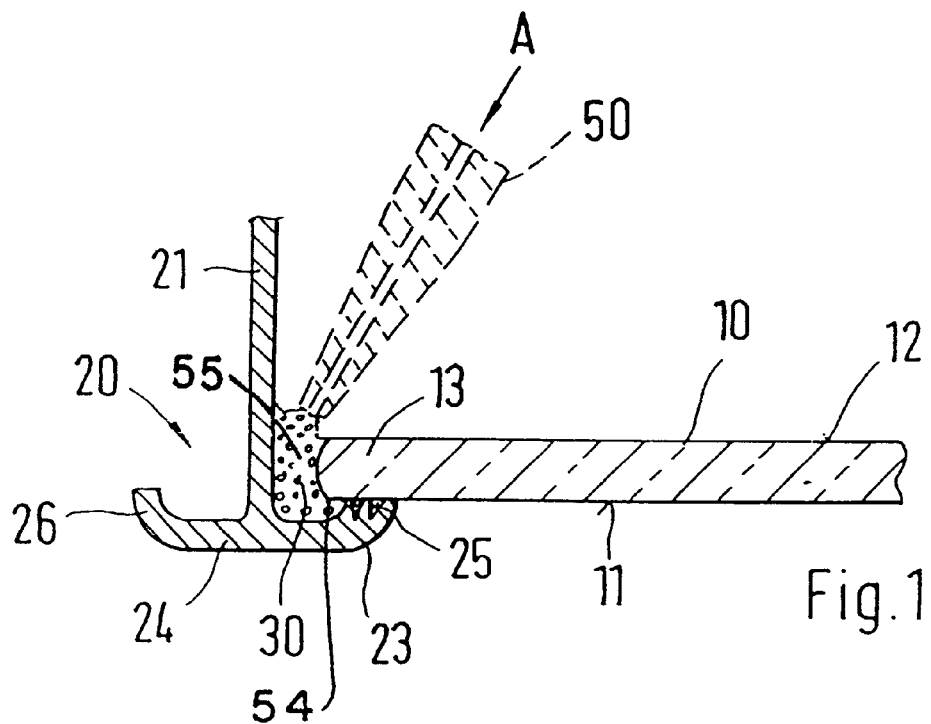
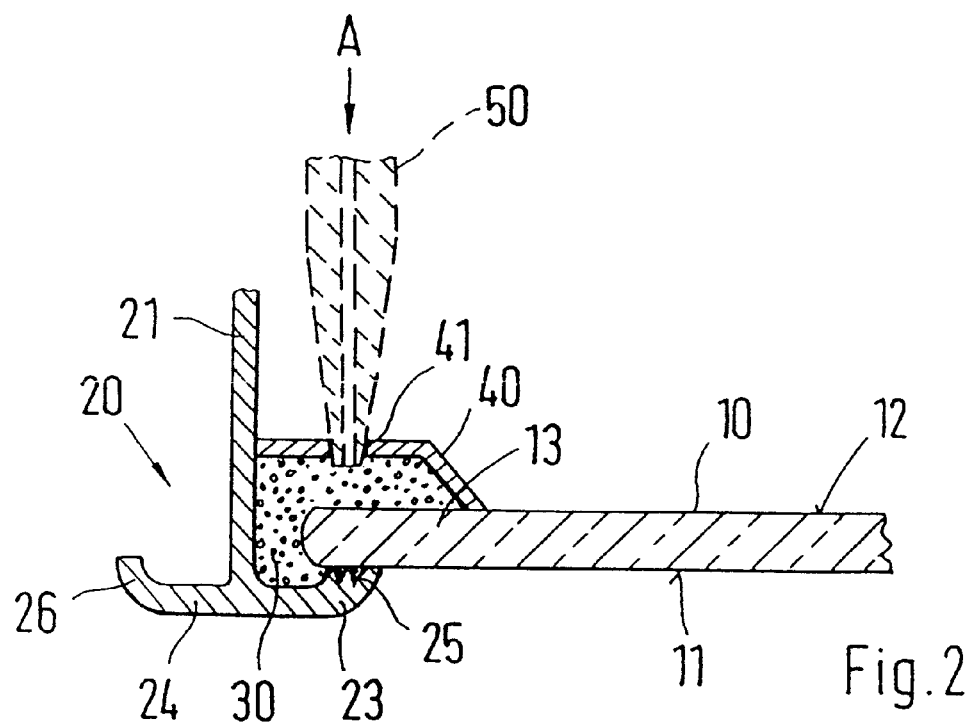

MOUNTING ARRANGEMENT FOR A COOKING PLATE AND RELATED METHOD

FIELD OF THE INVENTION

This invention relates generally to stoves and, more particularly, to stove tops used for cooking in, e.g., households, food service establishments and the like.

BACKGROUND OF THE INVENTION

Commonly, stoves are configured for use with gas or electric burners exposed through openings in the top cooking plate. A more recent innovation involves "smooth top" stoves, i.e., stoves having electric burners mounted beneath an imperforate, substantially flat cooking plate made of special, high-temperature glass.

Irrespective of the specific type of burner and configuration of the cooking plate, it is common to mount the cooking plate to the supporting stove structure by means of some type of frame. At the least, the frame covers and masks the edges of the stove structure and the cooking plate and provides a finished product of attractive appearance.

One approach to cooking plate mounting is disclosed in European Patent Office (EPO) document EP 0 391 122 A2. Such document discloses a frame having four planar portions. The cooking plate is secured between two of such portions, namely, between a covering portion and a carrier portion that are parallel to each other. The covering section and the carrier section are connected to the cross piece as one piece. The frame with its supported cooking plate are mounted in an installation housing configured so that there is space below the cooking plate.

While such cooking plate mounting arrangements have been generally satisfactory, they are not without disadvantages. One disadvantage of the arrangement disclosed in the above-noted EPO document is that a great deal of care and effort is required in order to manufacture such a mounting support and to attach it to the cooking surface. One reason this is so is that the frame cannot be made as a single piece since it would not then be possible to fit the cooking plate between the covering and carrier portions on all four sides. Of course, this translates into higher manufacturing costs and consumer prices.

Another disadvantage of the arrangement disclosed in the above-noted EPO document is that there is very little dimensional "forgiveness." That is, the component parts used to make the frame and the cooking plate must be held to close tolerances or they cannot be properly assembled.

Still another disadvantage of the arrangement disclosed in the above-noted EPO document is that the frame and cooking plate mount rigidly to one another. There is no cushioning of the cooking plate in the frame.

A new mounting support and related method which addresses shortcomings of the prior art would be a distinct technological advance in the art.

OBJECT OF THE INVENTION

It is an object of this invention to provide a stove top mounting support and related method which address some of the problems and shortcomings of the prior art.

Another object of this invention is to provide a stove top mounting arrangement and related method which help reduce manufacturing costs.

Another object of this invention is to provide a stove top mounting arrangement and related method which require less stringent manufacturing tolerances for the related parts.

Yet another object of this invention is to provide a stove top mounting arrangement and related method which involve a cushioned, somewhat-resilient mount for the cooking plate. How these and other objects are accomplished will be apparent from the following descriptions and from the drawings.

SUMMARY OF THE INVENTION

The invention involves a mounting arrangement for a stove-top cooking plate having upper and lower surfaces and a perimeter edge. A frame is around the plate and includes a support portion extending over the plate perimeter edge and a rib extending away from the support portion.

In the improvement, the perimeter edge and the rib define a space between them and such space is filled with reaction foam, i.e., a foam which increases in volume and porosity when its two components are injection-mixed and exposed to air at ambient pressure. Most preferably, the foam is applied through an injection nozzle.

In more specific aspects of the invention, the support portion of the frame and the cooking plate define a gap between them. The reaction foam contacts the upper surface and fills the gap. That is, the foam contacts both the plate edge and upper surface as well as the frame rib and support portion. And in another embodiment, the reaction foam extends between the rib and the perimeter edge and contacts the under surface of the cooking plate as well as the edge and upper surface of such plate.

In another aspect of the invention, the support portion includes a support edge having at least one lip sealing element mounted therein. More preferably, two side-by-side sealing elements are used in lamellar fashion and such element(s) bear against the upper surface of the cooking plate. The sealing elements help prevent injected foam from forcing its way between the interstice between the frame support edge and the upper surface of the cooking plate.

In a highly preferred mounting arrangement, the reaction foam is selected from a group of reaction foams consisting of polyurethane, silicone, ethylene-propylene diene monomer (EPDM—a terpolymer elastomer) and polytetrafluoroethylene (PTFE) foam. Each of these foams is adhesive and permanently elastic, thereby imparting a degree of resiliency to the way the cooking plate and frame are secured to one another.

Another aspect of the invention involves a new method for mounting a cooking plate and a mounting frame to one another. The method includes constructing a mounting frame having a support portion and a rib and providing a substantially flat cooking plate having a perimeter edge. The cooking plate and the mounting frame are placed against one another and relatively positioned so that the cooking plate and the rib have a space between them. The space is then filled with foam. Most preferably, the mounting frame and the cooking plate are inverted to upside-down positions before or when placed against one another.

More specifically, the placing step includes placing the cooking plate against the support portion and placing a foam-enclosing member to cover the space between the cooking plate and the rib. The filling step includes injecting foam into the space through a nozzle. And when a foam-enclosing member is used, it is preferred that the foam be injected by placing the nozzle against or through one or more openings formed in such member.

Further details of the invention are set forth in the following detailed description and in the drawings.

BRIEF DESCRIPTION OF THE DRAWINGS

FIG. 1 is an elevation view, in section and inverted from the upright position as used in a stove, of one embodiment of the mounting arrangement involving a mounting frame, a cooking plate and reaction foam. Parts are shown in dashed outline and other parts are broken away.

FIG. 2 is an elevation view, in section and inverted from the upright position as used in a stove, of another embodiment of the mounting arrangement involving a mounting frame, a cooking plate, a foam-enclosing member and reaction foam. Parts are shown in dashed outline and other parts are broken away.

DETAILED DESCRIPTIONS OF THE PREFERRED EMBODIMENTS

Referring to FIG. 1, one preferred embodiment of the new mounting arrangement includes a cooking plate 10, a surrounding mounting frame 20 and foam 30 securing the plate 10 and the frame 20 to one another as further described. The method, also described below, is preferably carried out while the mounting frame 20 is inverted and supported on a fixturing jig or the like (not shown). In turn, the plate 10 is oriented so that its upper surface 11, i.e., that surface 11 which faces upwardly when the related stove is in use, faces downwardly and (of course) so that its under surface 12 faces upwardly. The plate 10 is supported on the frame 20.

Another embodiment shown in FIG. 2 includes a foam-enclosing member 40 used during foam injection and later removed after the foam has "set up" to its final, non-viscous but somewhat elastic or resilient state. Highly preferred foams include polyurethane, silicone, EPDM and PTFE foam.

The frame 20 is constructed as a unitary piece to entirely surround the perimeter edge 13 of the plate 10. In the alternative, such frame 20 may be constructed of two or more pieces configured and arranged to surround such edge 13. In the inverted position shown in the drawings, the frame 20 is shaped generally like an inverted "T" and includes a support portion 23 and a covering section 24 which are laterally coextensive with one another. The portion 23 and the section 24 each include a turned or curved extension 26 and the edge 13 define a small gap 54 between them.

The extension of the support portion 23 includes at least one, and preferably two, sealing elements 25 of lamellar form embedded therein. And when the frame 20 and cooking plate 10 are fully assembled to one another using foam as described below, the extension 26 of the covering section 24 supports the fully completed assembly in the stove top.

The frame 20 also includes a rib 21 extending away from the portion 23 and section 24. Most preferably, the rib 21 and the portion 23 are generally perpendicular to one another.

As to dimensional relationships, the cooking plate 10 (including its perimeter edge 13) and the frame 20 are cooperatively configured so that the support portion 23 and the edge 13 overlap one another when the frame 20 and plate 10 are first placed with respect to one another. And the cooking plate 10 and the frame 20 are also cooperatively configured so that there is a space 55 between the edge 13 and the rib 21.

The related new method includes constructing a mounting frame 20 having a support portion 23 and a rib 21. A substantially flat cooking plate 10 having a perimeter edge 13 is also provided. The cooking plate 10 and the mounting frame 20 are placed against one another and relatively positioned so that the cooking plate 10 and the rib 21 have a space 55 between them. The space 55 is then filled with foam 30. Most preferably, the mounting frame 20 and the cooking plate 10 are inverted to upside-down positions before or when placed against one another.

More specifically, the placing step includes placing the cooking plate 10 against the support portion 23 and placing a foam-enclosing member 40 to cover the space 55 between the cooking plate 10 and the rib 21. The filling step includes injecting foam 30 into the space 55 through a nozzle 50 in the direction "A." As shown in FIG. 1, practicing the method in this way provides foam adherence between the rib 21 and the edge 13. And when the support portion 23 is configured with a curved extension 26, foam 30 also adheres to the portion 23 and the plate upper surface 11.

In a variation of the method shown in FIG. 2, a foam-enclosing member 40 is placed prior to injecting foam 30. Such member 40 has one or a plurality of openings 41 formed in it. When the foam-enclosing member 40 is used, the nozzle 50 is placed against or through one or more openings 41 formed in such member 40. After the foam 30 has set to its permanent state, the member 40 is lifted away. It is to be noted that in the method shown in FIG. 2, the foam 30 also adheres to the plate under surface 12 as well as to the edge 13 and the upper surface 11.

A preferred foam 30 is made from two liquid components which are of low viscosity, i.e., easy flowing. When such components are mixed during injection, they react and increase dramatically in volume. The resulting foam 30 thereby fills the entire free space 55 that is between the mounting frame 20 and the cooking plate 10. And after the foam 30 hardens to a slightly resilient or elastic state, it effects strong adhesion of the cooking plate 10 and the mounting frame 20 to one another.

While the principles of this invention have been described in connection with specific embodiments, it should be understood clearly that these descriptions are made only by way of example and are not intended to limit the scope of the invention.

What is claimed:

1. In a mounting arrangement for a cooking plate having a perimeter edge, such arrangement including the plate and a frame around the plate, the improvement wherein:

the cooking plate has an upper surface and an under surface;

the frame is open with respect to the under surface of the cooking plate and includes a support portion extending over the perimeter edge and a rib extending away from the support portion;

the perimeter edge and the rib define a space therebetween; and the space is substantially, completely filled with an in-situ-formed reaction-foam-adhesive support, whereby the reaction-foam adhesive provides full support of the cooking plate to the frame.

2. The mounting arrangement of claim 1 wherein:

the support portion and the cooking plate define a gap therebetween; and the reaction foam contacts the upper surface and fills the gap.

3. The mounting arrangement of claim 1 wherein the support portion includes at least one lip sealing element against the upper surface of the cooking plate.

4. The mounting arrangement of claim 1 wherein:

the reaction foam extends between the rib and the perimeter edge; and the reaction foam contacts the under surface.

5. The mounting arrangement of claim 2 wherein:

the reaction foam extends between the rib and the perimeter edge; and the reaction foam contacts the under surface.

6. The mounting arrangement of claim 1 wherein the reaction foam is selected from a group of reaction foams consisting of polyurethane, silicone, EPDM and PTFE foam.

7. The mounting arrangement of claim 4 wherein the reaction foam is selected from a group of reaction foams consisting of polyurethane, silicone, EPDM and PTFE foam.

8. The mounting arrangement of claim 1 wherein the reaction foam is permanently elastic.

9. The mounting arrangement of claim 4 wherein the reaction foam is permanently elastic.

10. A method for mounting a cooking plate and a mounting support to one another including the steps of:

providing a cooking plate having a perimeter edge, an upper surface, and an under surface;

constructing a mounting frame that is open with respect to the under surface of the cooking plate, said mounting frame having a support portion extending over the perimeter edge, and a rib extending away from the support portion;

placing the cooking plate and the mounting frame against one another so that the cooking plate and the rib have a space therebetween; and filling the space with an in-situ-formed reaction foam.

11. The method of claim 10 wherein the placing step includes placing the cooking plate against the support portion.

12. The method of claim 10 wherein the placing step also includes placing a foam-enclosing member to cover the space.

13. The method of claim 11 wherein the filling step includes injecting foam into the space through a nozzle.

14. The method of claim 12 wherein the filling step includes injecting foam into the space through a nozzle such that the foam contacts the under surface of the cooking plate.

* * * * *

UNITED STATES PATENT AND TRADEMARK OFFICE
CERTIFICATE OF CORRECTION

PATENT NO. : 6,085,643  
DATED : July 11, 2000  
INVENTOR(S) : Horst Stedron

Page 1 of 1

It is certified that error appears in the above-identified patent and that said Letters Patent is hereby corrected as shown below:

<u>Title page, item [45],</u>  
Delete, "Date of Patent: * Jul. 11, 2000  
Replace with: -- Date of Patent: Jul. 11, 2000 --

<u>Title page,</u>  
Delete: "[*] Notice: This patent isusued on a continued prosecution application filed under 37 CFR 1.53(d), and is subject to the twenty year patent term provisions of 35 U. S.C. 154(a)(2)."

<u>Title page,</u>  
Below [22] Filed : Jan. 27, 1998 insert:

-- [30]  Foreign Application Priority Data  
Jan. 31, 1997    [DE]    Germany                197 03 270.2 --

Signed and Sealed this

Eighteenth Day of September, 2001

*Attest:*

*Attesting Officer*

NICHOLAS P. GODICI  
*Acting Director of the United States Patent and Trademark Office*